(No Model.) 3 Sheets—Sheet 1.
R. NOURY.
ELECTRICAL STEERING GEAR.
No. 537,124. Patented Apr. 9, 1895.
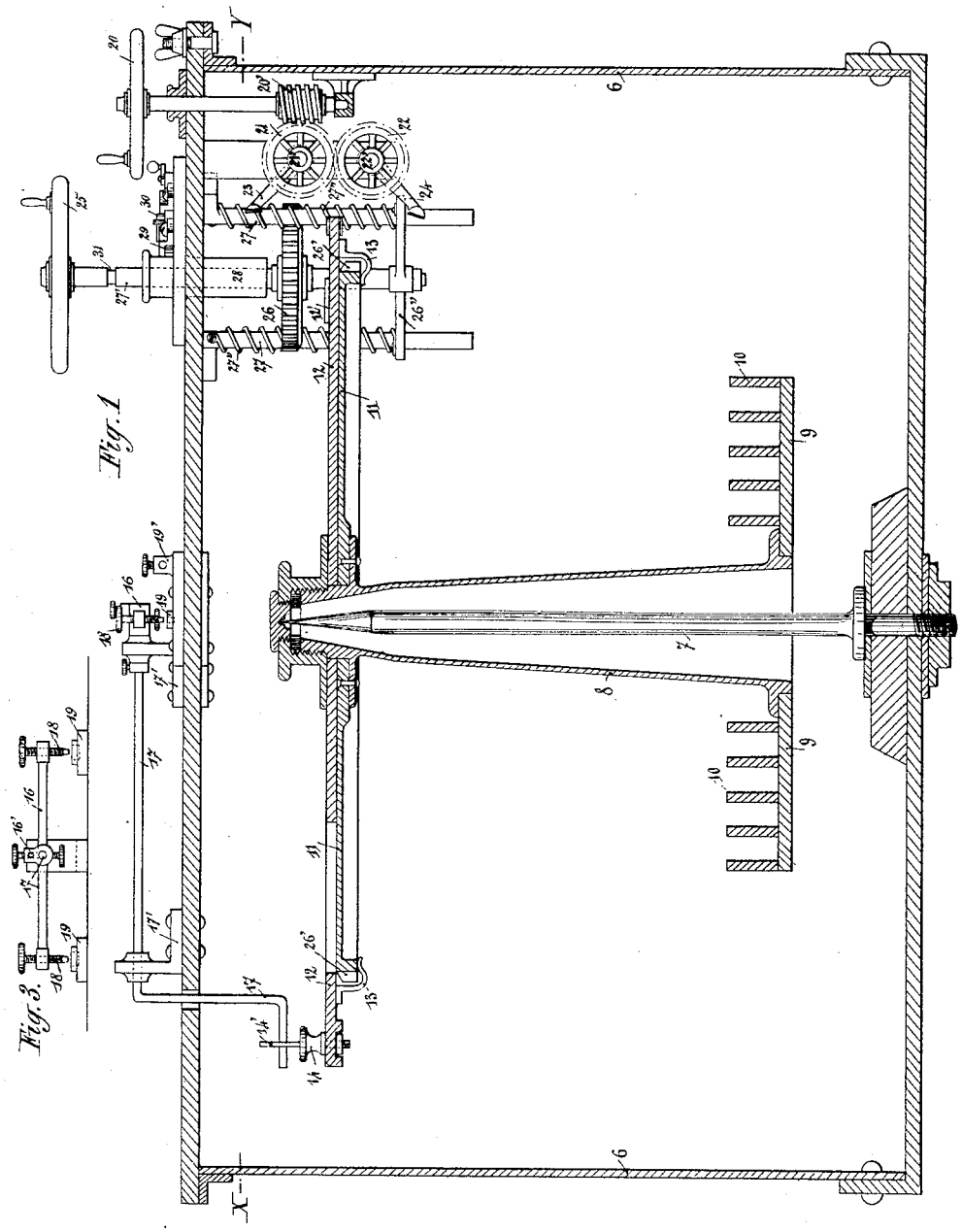
Witnesses:
J. M. Fowler Jr.
Thomas Durant
Inventor:
Rodolphe Noury
By Church & Church
his Attorneys.

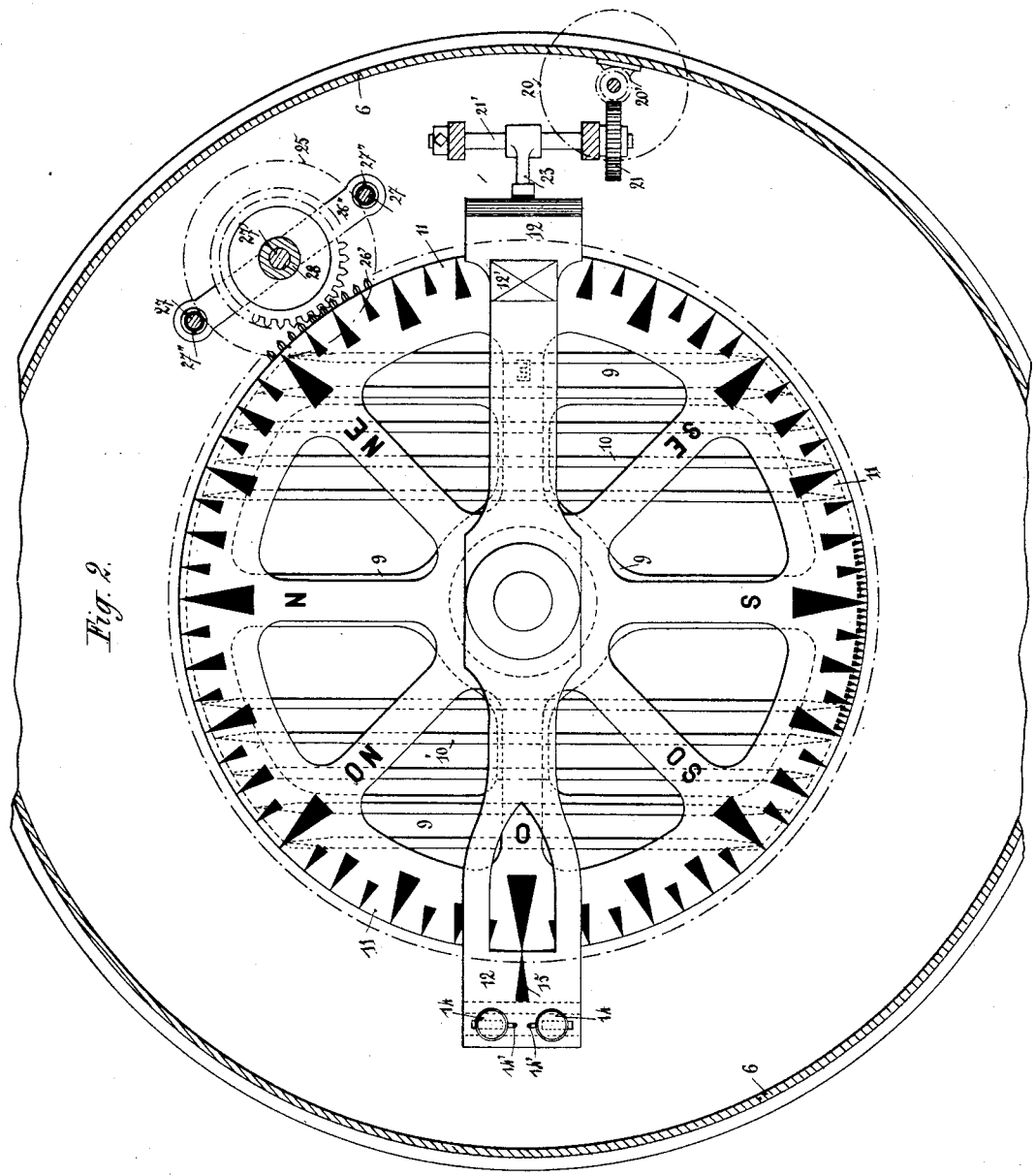

(No Model.) 3 Sheets—Sheet 3.
R. NOURY.
ELECTRICAL STEERING GEAR.
No. 537,124. Patented Apr. 9, 1895.
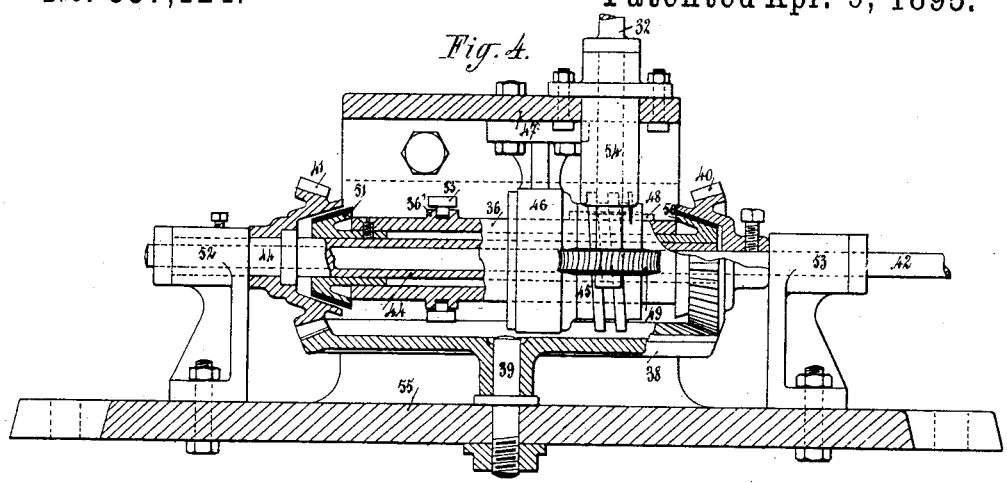
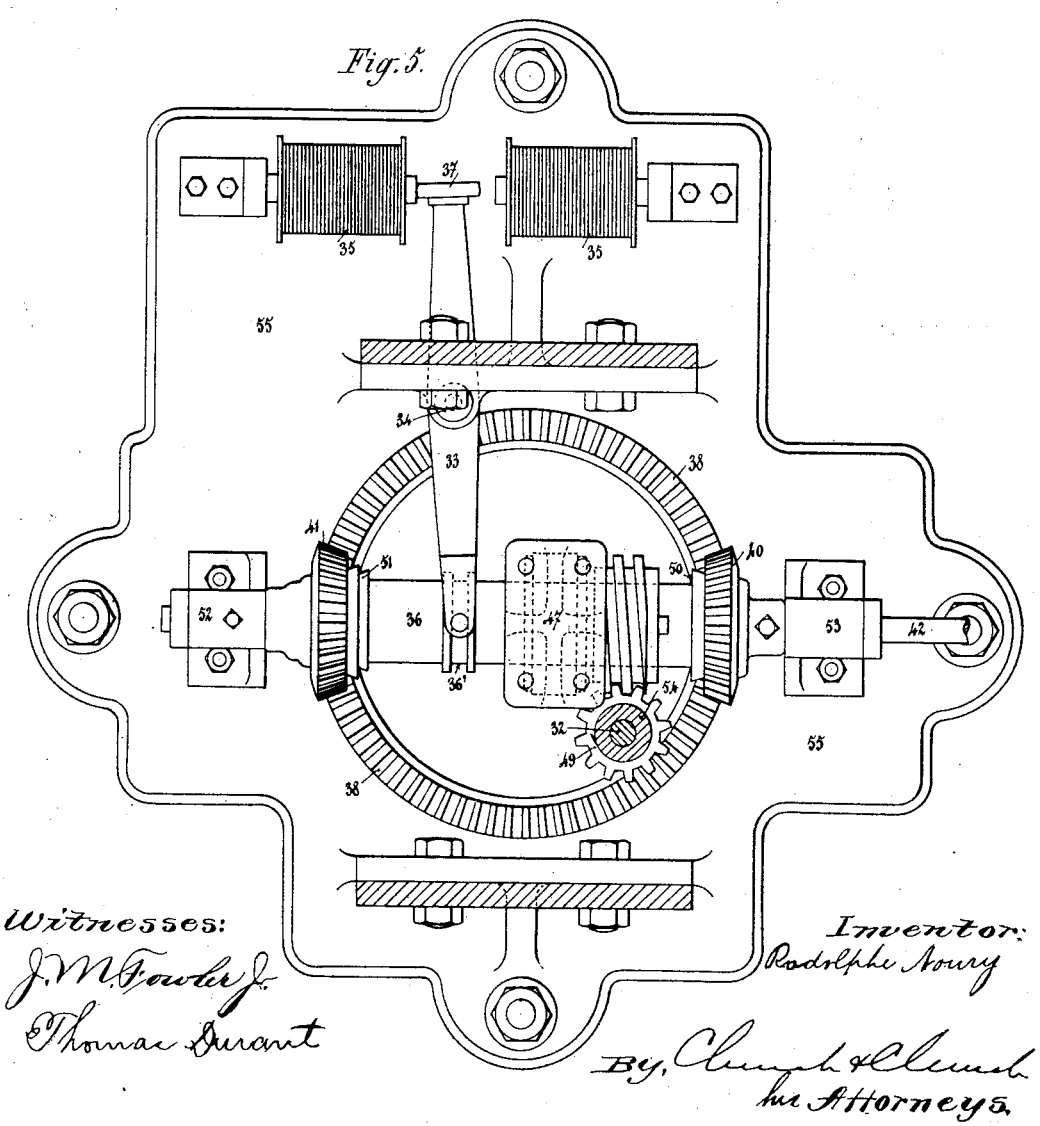
Witnesses:
J. M. Fowler Jr.
Thomas Durant
Inventor:
Rodolphe Noury
By Church & Church
his Attorneys.

UNITED STATES PATENT OFFICE.

RODOLPHE NOURY, OF NOUVEAU PHALÈRE, GREECE.

ELECTRICAL STEERING-GEAR.

SPECIFICATION forming part of Letters Patent No. 537,124, dated April 9, 1895.

Application filed March 12, 1894. Serial No. 503,395. (No model.)

*To all whom it may concern:*

Be it known that I, RODOLPHE NOURY, a citizen of the Republic of France, residing at Nouveau Phalère, Greece, have invented certain new and useful Improvements in or Relating to Steering-Gear for Ships, of which the following is a specification.

This invention relates to maritime navigation and has for its essential object to enable all manual operations for steering a prescribed course by the mariner's compass to be dispensed with, and replaced by an automatic steering device for keeping a perfectly straight and true course by the mariner's compass.

The mariner's compass, as a whole, according to this invention called "governo-motor" compass, consists essentially of two chief parts: first, the mariner's compass, properly so-called, fitted with its adjusting arrangements or devices; second, the transmitting device for operating the helm or rudder in consonance with the movements of the compass, the said transmission being effected by means of an electric current, and suitable mechanism.

In the accompanying drawings: Figure 1 is a vertical section of the mariner's compass and its fittings, complete. Fig. 2 is a horizontal section and plan of the same, on the line X Y of Fig. 1. Fig. 3 is a detail-drawing, completing the above figures and showing the arrangement of electric contacts whereby the transmission of the movements of the compass to the helm is effected. Fig. 4 is an elevation, partially in vertical section, of the transmitting mechanism. Fig. 5 is a plan of the same, the upper support or framing being supposed to be removed.

Referring to Figs. 1, 2, and 3, it will be seen that the compass, properly so called, consists essentially of a cylindrical case 6 with flat bottom and a flat glass top, arranged as usual in a cardanic suspension device (or gimbals). In the center of the case 6 is fixed a vertical pivot 7 carrying, suspended on its point, the entire movable system, comprising a coned cylindrical sleeve 8 surrounding the pivot and having, fixed to its lower extremity, an annular plate 9 carrying a series of parallel magnets 10 whereby the "flower" or north-point of the compass is kept steadily pointing to the magnetic north.

The sleeve 8 carries on its upper end, fixed to a flange specially provided *ad hoc*, a toothed wheel or circular plate 11 forming the "fly" or compass-card, which, with this view, is graduated and marked like an ordinary mariner's compass. This card is so fixed upon the coned cylindrical sleeve 8 that the diameter which passes through the north-point is exactly parallel to the line or direction of the series of magnets, and naturally, the said north-point coincides in position with north poles of the magnets.

Upon and at the periphery of the compass-card is arranged an alidade 12 (after the manner of a vernier-arm) which is kept in close connection with the card by the action of two springs 13 diametrically opposite one another, so that their circumferential displacement on the plate or wheel of the card requires the exercise of a certain amount of force.

The indicator end of the alidade 12 has an opening cut in it over the rhumb-circle, and is marked with a fixed-point 15 the coincidence of which with any point on the rhumb-circle indicates the sailing-course. On the same arm, outside the periphery of the toothed wheel or plate of the card 11 the alidade carries two symmetrical screw-nuts 14 on vertical spindles 14' bent inward toward each other the distance between the points being adjustable at will. On the extremity of the other arm of the alidade, over the rhumb-circle, is fixed a counterpoise weight 12' which balances the weight of the parts carried at the opposite extremity.

Outside the casing of the compass 6 on the upper plate of the cover, and centrally situated over the alidade, is fixed a transverse balance-beam 16 fixed at the extremity of a rod 17 carried horizontally in bearings 17' in such manner as to be capable of rotating therein, and prolonged, at the opposite end to the balance-beam 16 by a cranked portion, passing downward into the case of the compass and terminating, above the alidade, between the points of the two vertical adjustable elbowed spindles 14' of the two screw-nuts 14 on the alidade 12. The balance-beam is fitted with a central terminal 16' and with screws 18, one at each end, arranged to act in connection with contact-studs 19 placed on one of the supports 17' which also carries two symmetrical terminals 19' for transmitting the current. It will readily be understood that, under these conditions every movement of the alidade 12 in one direction or the other, will produce, by the action of the bent spindles 14' upon the cranked prolongation of the horizontal rod 17 an oscillation of the latter, which, being reproduced in the transverse balance-beam 16 so that one of the two screws 18 at the end of this balance beam will come in touch with one of the contact-pieces 19 and close the circuit, will transmit the electric current, received at the terminal 16' to the transmitting mechanism in manner as will hereinafter be seen.

The regulation and adjustment in regard to direction take place by means of the gripper apparatus operated by the hand wheel 20 and a device for altering the position of the compass-card 11 in relation to the alidade 12 which latter mechanism is controlled by another hand-wheel 25.

By means of the hand-wheel 20 a shaft and worm-wheel 20' are rotated, and drive a train of two equal spur-wheels 21 and 22 mounted one above the other in the same vertical line on shafts rotating in bearings carried by the same supports, between which latter each of the two wheels carries an arm 23 and 24 with a pallet, whereof the combination and the approach to each other of the two free ends, form nippers which take hold of the alidade near the edge and keep it for the time being immovable.

By means of the other hand wheel 25 a vertical shaft 27' is set in motion which traverses a fixed sleeve 28 in such manner as to rotate and ascend and descend within it. This vertical shaft 27' is prolonged downward into the case of the compass 6 and carries a horizontal toothed wheel 26 whose teeth correspond and engage with those of the periphery of the wheel or plate 26' forming the compass-card or fly. The said shaft 27' also carries at its lower extremity a terminal guide-piece 26" provided with orifices which slide up and down on two fixed vertical rods 27 which are secured in any suitable manner to the cover of the compass-case and on which are mounted two spiral springs 27" whereof the upper ends are made fast to the vertical rods at some higher points within the case, and the lower ends are secured to the sliding guide-piece.

Upon the exterior base or shoulder plate carrying the fixed sleeve 28 is seated a bolt 29 acted upon by a spring 30 and which being always thereby pressed in close contact with the surface of the shaft 27', engages in a groove or annular recess 31 (provided in the shaft 27' for the purpose) whenever, in consequence of the descent of the shaft 27', taking with it the toothed wheel and guide-piece, the said groove reaches the level of the said bolt. When this has happened the shaft is arrested in its downward movement in a position which causes the engagement of the spur-wheel 26 with the wheel or plate 26' of the compass-card 11, and which renders it possible by turning the hand-wheel 25 to cause the compass-card to rotate and bring the north point into any desired position in reference to the fixed point of the alidade 12.

In consequence of the descent of the vertical shaft 27' and of the guide-bar 26" carried by it, the spiral springs 27" are energized by their elongation, so that, as soon as the spring bolt 29 is disengaged from the annular groove 31 in the shaft 27' the said springs being released, tend to resume their normal positions, and lift the shaft 27' with all its parts and thereby effect the disengagement of the spur-wheel 26 from the teeth of the compass-card 26'.

The compass thus constituted is combined with mechanism shown in Figs. 4 and 5 which is designed to act automatically upon the helm or rudder, in consonance with the movements of the compass-card which are continuously transmitted to it as they arise under the magnetic impulse, so as to regulate the steering of the ship mechanically, and insure the course being maintained in an absolutely straight line, in any given direction, as desired. The parts of this transmitting mechanism are mounted on a base-plate 55 solidly secured in any convenient position on board the ship. Two electro-magnets 35 are arranged side by side to receive the electric current communicated by the two corresponding contact-studs 19 on the compass-case and to act upon the end 37 of a lever arm 33 placed between these electro-magnets serving as an armature. This lever 33 is arranged to pivot upon a fixed point 34, and carries on its extremity, between the electro-magnets a plate of soft iron 37, which, when attracted by one or the other of the two electro-magnets, according to the passage of the current, produces an oscillating movement of the lever 33. The opposite end of this lever is in the form of a fork whereof the arms embrace a sleeve 36 and engage by means of suitable studs in an annular groove 36' formed in the said sleeve, which is caused at each oscillation to partake of the reciprocating movement of the lever. The sleeve 36 carries outside one part of it a second sleeve whereof one portion is formed as an endless screw 45 while the other part is held so as to be capable of rotating in a support 46 forming a plumber block, of which the base-plate is fixed to an arcade or crown 47 of the upper part of the framing 55. A key lodged in a keyway on the sleeve 36 unites this latter to the worm or endless screw 45 while permitting it to slide freely in a longitudinal direction within the said worm 45. This worm gears with a helicoidal wheel 49 keyed on the lower end of a vertical shaft 32 carried in a socket or sleeve 54 supported on the arcade or crown of the upper part of the framing 55. This shaft 32 is connected with the helm or rudder by means of chains which transmit thereto a movement of rotation to the right or to the left in order to maintain a straight course. Within the sleeve 36 and concentric therewith is another fixed sleeve 44, mounted on a central main shaft 42 turning freely therein, and carried in two bearings 52 and 53. This main shaft is caused continuously to rotate in the same direction by any suitable prime-motor or belt-driving mechanism arranged *ad hoc*. Between the two bearings 52 and 53 and immediately adjacent to 53 the shaft 42 carries a bevel-pinion 40 keyed or otherwise fixed thereto, and to which the said shaft transmits its movement of rotation. Similarly, between the two bearings and immediately adjacent to 52 another bevel-pinion 41 in all respects the fellow to 40 is mounted to run loose on the inner fixed sleeve 44. These two pinions have their bosses hollowed out and coned to receive and form friction clutches or engaging and disengaging gear with smooth friction-cones 50 and 51 which however cannot come into simultaneous operation, but only separately and alternately engaged with their respective hollow bevel-pinions 40 and 41. These smooth cones 50 and 51 are secured respectively by screws, keys, or other suitable means, to the two several ends of the outer sleeve 36 which latter is therefore compelled to partake of their movements of rotation.

The bevel pinions 40 and 41 are geared on opposite sides of a large central bevel-wheel 38 arranged to rotate freely and loosely on a vertical axis 39 fixed to the bed-plate of the framing 55. With these mechanical arrangements, it follows clearly that the bevel wheel 38 rotates in the same direction when driven by the pinion 40 which is fixed to the motor shaft, and drives at the same time the other pinion 41 which runs loose with a rotary movement in the opposite direction. If, then, one or the other of the smooth cones 50 or 51 is engaged respectively with one or the other of the corresponding bevel pinions 40 or 41 the outer sleeve 36 and consequently the worm 45 will be rotated in one direction or the other; whence will result rotation to the right or to the left of the helicoidal wheel 49 and the vertical shaft 32, and therefore of the helm, which is governed by the chains attached to the shaft 32, an oscillation taking place in the direction corresponding to that tending to the required course held by the ship.

The mechanism operates as follows:—The compass is so arranged on the ship that the direction of the "flower" of the compass-card corresponds to the direction of magnetic north, and the horizontal cranked rod 17 which effects the transmission of the electric current coincides therewith and lies in the same plane and direction. The adjustment of the compass-card for a prescribed course is effected as follows:—The alidade 12 is fixed in position by means of the pallets 23 and 24 which are brought to bear upon and grip its edge by manipulation of the hand-wheel 20 which rotating the worm 20' transmits the necessary movement to the geared wheels 21 and 22. The compass-card is then shifted into the position indicating the desired course by the fixed point of the alidade, which is effected by the manipulation of the other hand-wheel 25. The vertical shaft 27' carrying this wheel is depressed until the spur-wheel 26 engages with the toothed wheel 26' attached to the "fly" of the compass 11 which position is maintained by the engagement of the spring bolt 29 with the annular groove or neck 31 of the vertical shaft 27'. Then by turning the hand-wheel 25 the fly 11 is caused to rotate until the rhumb-point which corresponds to the desired course is brought to coincide with the fixed-point 15 of the alidade. These adjustments being completed, and the course thus set, by the simple withdrawal of the spring bolt 29 from the groove 31 in the vertical shaft 27' the spur-wheel 26 will be disengaged from the fly 11, leaving it free to be drawn up by the reaction of the spiral springs 27''. The alidade 12 is then released by turning the hand wheel 20 in the opposite direction to that in which it was previously rotated, whereby the pallets 23 and 24 which grip its edge are opened. By the action of the magnets 10 carried by the annular plate 9, attached beneath the fly 11, the alidade 12 (which after the adjustment, remains attached to the fly by the two springs 13 in the same position as set for the course prescribed) will tend, in company with the compass-card, to revert to its original direction of magnetic north; and in swinging round will bring one or the other of the elbowed spindles 14' (on the side opposite to the direction of its rotation) into contact with the cranked end of the horizontal rod 17 and pressure against this will cause an oscillation of the balance-beam 16 on the same side as that spindle 14' which was brought into contact with the cranked end of 17. The corresponding screw 18 being thereby pressed against its contact stud 19 closes the circuit and the electric current received at the central terminal 16' will be transmitted to the corresponding electro-magnet 35 of the transmitting mechanism before described. The armature 37 will thus be attracted to the electro-magnet around which the current is circulating and will produce an oscillation of the pivoted lever 33 in the direction required to effect in the manner already described, the rotation of the shaft 32 causing the helm to oscillate in the required direction. The movement of the helm will continue as long as the electric current is uninterrupted, *i. e.*, until the swinging crank of the horizontal rod 17 becomes isolated between two points of the elbowed spindles carried by the alidade 12. Neither of the screws 18 on the balance beam being then in contact with its corresponding electric contact stud 19, the crank, rod, and balance beam will acquire this position so soon as the fly or compass-card, and consequently the alidade, have reverted to the direction of magnetic north; that is to say, whenever the longitudinal axis of the ship coincides with the direction for which the compass has been adjusted, and the ship is consequently holding her course as set.

In Fig. 2 the compass-card is shown to be set for a course due west. With the smallest deviation from the true course, electrical contact will be made on the side where it is rendered necessary to compensate for the deviation, and to maintain the true course; which is thus held continuously in an absolutely straight line until changed; and this constitutes the great advantage of the improved system herein described.

While I have specifically described a special and independent gripping mechanism for the alidade and although such a mechanism or its equivalent is desirable in order that the greatest precision may be attained, still even though no special grippers be employed the alidade will be held against rotating with the compass card, farther than the distance between the adjustable stops, by the circuit controller arm, in the form of device shown, or it may be manually held, if desired, and hence it is not absolutely essential that the gripping mechanism be employed.

I claim—

1. In a compass for the automatic steering of vessels the combination with the magnetically controlled compass card and means for manually shifting the position of the same from the exterior of the compass box, of the alidade adjustably mounted on said card to swing therewith and a circuit controller moved by the alidade in each direction; substantially as described.

2. In a compass for the automatic steering of vessels, the combination with the magnetically controlled compass card and an alidade adjustably mounted on said card to swing therewith, of a holder for the alidade, a gearing for shifting the compass card and a circuit controller moved by the alidade; substantially as described.

3. In a compass for the automatic steering of vessels, the combination with the magnetically controlled compass card and alidade adjustably mounted on said card to swing therewith, of adjustable stops moved by the alidade and a circuit controller controlled by said stops; substantially as described.

4. In a compass for the automatic steering of ships the combination with the magnetically controlled compass card, an alidade adjustably mounted on said card with means for shifting the relative positions of the card and alidade a circuit controller mounted in fixed bearings and adjustable stops for moving the same controlled by the alidade, substantially as described.

5. In a compass for the automatic steering of vessels, the combination with the magnetically controlled compass card and alidade adjustably mounted thereon, of the adjustable stop projections mounted on the alidade a circuit controller and an operating arm therefor extending down between the stop projections on the alidade with means for shifting the relative position of the compass card with relation to the alidade; substantially as described.

6. In a compass for the automatic steering of vessels, the combination with the magnetically controlled compass card and a shiftable gearing movable into and out of gear with said card for turning the same on its pivotal center, of the alidade adjustably mounted on the compass card to swing therewith and a circuit controller moved by the alidade in each direction; substantially as described.

7. In a compass for the automatic steering of vessels the combination with the compass card controlled by terrestrial magnetism and a shiftable gearing for turning said card, of an alidade adjustably mounted on said card to swing therewith, oppositely arranged adjustable stops on the alidade and a circuit controller having an operating arm extending between said stops; substantially as described.

8. In a compass for the automatic steering of vessels, the combination with the compass card controlled by terrestrial magnetism and a shiftable gearing for turning said card on its pivotal center of an alidade adjustably mounted on said card, a circuit controller controlled by the alidade and a manually controlled holder cooperating with the alidade to hold the same while the compass card is being shifted; substantially as described.

9. In a compass for automatically steering vessels, the combination with the compass card controlled by terrestrial magnetism and the alidade adjustably mounted on said card with a circuit controller controlled thereby, of a shiftable gearing movable into and out of engagement with the compass card and oppositely moving manually controlled clamping arms cooperating with the alidade to hold the same while the compass card is being shifted; substantially as described.

10. In a compass for the automatic steering of vessels the combination with the compass card controlled by terrestrial magnetism and having the toothed periphery and the alidade adjustably mounted on said compass card, of the gear wheel movable into and out of gear with the teeth on the compass card, an operating handle for said gear wheel and means for holding the alidade against movement around its pivotal center; substantially as described.

11. In a compass for the automatic steering of vessels, the combination with the compass card having the toothed periphery and controlled by terrestrial magnetism and the alidade adjustably mounted on said card, of the gear wheel movable into and out of gear with the compass card, the pallets 23 for gripping the alidade, the gear wheels 21 connecting said pallets and the operating wheel 20 for moving the gear wheels; substantially as described.

In testimony whereof I have hereunto set my hand in the presence of the two subscribing witnesses.

R. NOURY.

Witnesses:
C. E. HUCHEEL,
GEORGE STRUTIGI.